United States Patent [19]

Nasu et al.

[11] Patent Number: 4,617,349

[45] Date of Patent: Oct. 14, 1986

[54] URETHANE RESIN COMPOSITIONS

[75] Inventors: Kohji Nasu, Nishinomiya; Ichiro Minato, Kobe, both of Japan

[73] Assignee: Takeda Chemical Industries, Ltd., Osaka, Japan

[21] Appl. No.: 792,491

[22] Filed: Oct. 28, 1985

[30] Foreign Application Priority Data

Nov. 2, 1984 [JP] Japan .................................. 59-232161

[51] Int. Cl.$^4$ ............................................. C08G 18/62
[52] U.S. Cl. .................................... 525/123; 525/127;
525/131; 528/60; 528/73; 528/75; 528/81
[58] Field of Search ....................... 525/123, 127, 131;
528/60, 73, 75, 81

[56] References Cited

U.S. PATENT DOCUMENTS 4,404,324 9/1983 Hock et al. ......................... 525/123
4,555,535 11/1985 Bednarek et al. ................... 525/123
4,578,426 3/1986 Lenz et al. .......................... 525/123

FOREIGN PATENT DOCUMENTS 55-19273 5/1980 Japan .

Primary Examiner—Maurice J. Welsh
Attorney, Agent, or Firm—Wenderoth, Lind & Ponack

[57] ABSTRACT

A urethane resin composition which comprises (i) a polyisocyanate component having 20/80 to 80/20 of a weight ratio on a solid basis of an $\alpha, \alpha, \alpha', \alpha'$-tetramethyl-xylylene diisocyanate derivative to a hexamethylene diisocyanate derivative and (ii) an acrylic polyol.

The urethane resin composition can provide coating films with excellent drying property, mechanical properties, weathering resistance and chemical resistance, and are advantageously used, for example, as a paint for automobile repairing uses.

7 Claims, No Drawings

URETHANE RESIN COMPOSITIONS

This invention relates to urethane resin compositions which exhibit excellent drying characteristics and weathering resistance and also provides coating films with improved performance.

Heretofore, the two-part polyurethane coatings consisting of acrylic polyols and aliphatic polyisocyanate compounds, because of their excellent properties, have found widened application in the automobile repairings, electric appliances for household uses, roof tiles, chemical plants, sidings for buildings, and the like. As the aliphatic polyisocyanates being utilized for these coatings, there are generally used derivatives, such as ω,ω'-diisocyanato-dimethylbenzene (hereinafter referred to briefly as "XDI"), bis(isocyanatomethyl)cyclohexane (hereinafter referred to briefly as "H₆XDI"), 3-isocyanatomethyl-3,5,5-trimethylcyclohexylisocyanate (hereinafter referred to briefly as "IPDI"), 4,4'-methylenebis(cyclohexylisocyanate) (hereinafter referred to briefly as "H₁₂MDI"), hexamethylene diisocyanate (hereinafter referred to briefly as "HDI") and trimethylhexamethylene diisocyanate (hereinafter referred to briefly as "TMHDI"). However, the coating films derived from these aliphatic isocyanate derivatives and acrylic polyols have both advantageous and disadvantageous physical properties as shown in Table 1, and neither of them is well-balanced in the physical properties that are required in the aforementioned application fields.

TABLE 1

| Physical properties required of the resulting coating film | XDI | H₆XDI | IPDI | H₁₂MDI | HDI | TMHDI |
|---|---|---|---|---|---|---|
| Drying property | ⊚ | O | ⊚ | O | X | X |
| Mechanical properties | O | Δ | X | Δ | ⊚ | ⊚ |
| Weathering resistance | X | O | ⊚ | O | ⊚ | ⊚ |
| Chemical resistance | ⊚ | ⊚ | O | ⊚ | Δ | Δ |

Note:
The marks, ⊚, O, Δ, and X, stand for "Excellent", "Good", "Fair" and "Poor", respectively.

For example, it is required of the paints for automobile repairing uses to meet all of the above-described requirements. For the purpose of solving the problem, there has been proposed a method (Japanese Published Examined Patent Application No. 19273/1980) of using as an isocyanate component polyisocyanate mixtures consisting of hexamethylene diisocyanate derivatives and 3-isocyanatomethyl-3,5,5-trimethylcyclohexyl isocyanate derivatives, but the method is found to fail to satisfy all of the above-described requirements.

In view of the circumstances as mentioned above, the present inventors conducted research to improve the physical properties of coating films, such as drying property, mechanical properties, weathering resistance and chemical resistance, and as a result, found that the mixing at a specifically defined ratio of α,α, α',α'-tetramethyl-xylylene diisocyanate derivatives and hexamethylene diisocyanate derivatives can yield satisfactory results. This finding has led to the completion of this invention.

Thus, this invention relates to a urethane resin composition which comprises (i) a polyisocyanate component having 20/80 to 80/20 of a weight ratio on a solid basis of an α,α,α',α'-tetramethyl-xylylene diisocyanate (hereinafter referred to briefly as "TMXDI") derivative and a hexamethylene diisocyanate derivative and (ii) an acrylic polyol.

TMXDI which is useful in this invention includes, for example, m-TMXDI, p-TMXDI and mixtures thereof. These have the following structural formulae and are produced by the methods described for example in U.S. Pat. Nos. 3,290,350, 4,130,577 and 4,439,616.

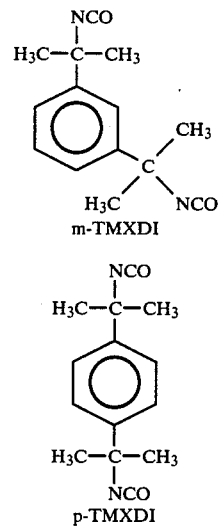

The TMXDI derivative which is used in this invention includes, for example, prepolymers having isocyanate groups at their terminals formed by reacting m-TMXDI, p-TMXDI or a mixture thereof as mentioned above with a low-molecular-weight polyol at an excessive isocyanate/hydroxyl ratio.

The low-molecular-weight polyol, which is usable in the production of such prepolymers, includes, for example, dihydric alcohols, such as ethylene glycol, propylene glycol, 1,2-butylene glycol, 1,3-butylene glycol, 1,6-hexanediol, diethylene glycol, dipropylene glycol, neopentyl glycol, neopentyl glycol hydroxypivalate, triethylene glycol, hydrogenated bisphenol A, xylylene glycol and 1,4-butylene glycol; trihydric alcohols, such as glycerol, trimethylolethane, trimethylolpropane and 1,2,6-hexanetriol; tetrahydric alcohols, such as pentaerythritol; and propylene-oxide or ethylene-oxide adducts of the above-described polyols.

These polyols may be used alone or as a mixture. The prepolymers derived from TMXDI and the above-mentioned low-molecular-weight polyols can be produced by carrying out a reaction at an NCO group/OH group ratio (equivalent ratio) of generally about 2.0 to 15, preferably about 4 to 8, at a temperature of normally 40° to 140° C., preferably 70° to 100° C., and removing, if desired, the unreacted isocyanate monomers by means of the conventionally employed thin-layer distillation or extraction technique, and the like. Such an organometallic catalyst as those based on tin, lead, zinc and iron may be utilized in this reaction.

The HDI derivative, which is useful in this invention, includes, for example, prepolymers having isocyanate groups at their terminals formed by reacting HDI with the above-described low-molecular-weight polyols in the presence of excessive isocyanate group in a manner similar to the reaction of TMXDI with low-molecular-weight polyols as mentioned above, biuret derivatives obtained by the reaction of HDI with water or amines (e.g., isobutylamine, n-propylamine, allylamine) or dimerized and trimerized products produced by allowing HDI to a reaction with use of the catalyst known as the dimerization or trimerization catalyst for organic diisocyanates. These polyisocyanates can be used alone or as a mixture.

The mixing ratio of the TMXDI derivative to the HDI derivative is in such amounts as correspond to a weight ratio as converted on a solid basis in the range of 20/80 to 80/20, preferably in the range of 30/70 to 70/30. The TMXDI derivative/HDI derivative ratio of less than 20/80 results in deteriorated drying property, thus bringing about sticking of dusts, sagging and migration of metallic colors. On the other hand, the TMXDI derivative/HDI derivative ratio of above 80/20 decreases mechanical properties and also deteriorates flexibility, adhesion and impact resistance of the resulting coating film.

In these polyisocyanate mixtures, there are often used organic solvents not having hydrogen active to the NCO group in order to improve the processability. As such organic solvents, there can be employed, for example, ester solvents, such as ethyl acetate, n-butyl acetate and isobutyl acetate; ether ester solvents, such as 2-ethoxyethyl acetate; aromatic hydrocarbon solvents, such as toluene and xylene; and ketone solvents, such as methyl ethyl ketone, methyl isobutyl ketone and cyclohexanone.

The acrylic polyol, which is usable in this invention, includes, for example, those having a molecular weight of 1,000 to 100,000 and a hydroxyl value of 20 to 200, particularly 60 to 120. Such acrylic polyols are obtained by copolymerizing hydroxyl-containing monomers such as 2-hydroxyethyl methacrylate, 2-hydroxypropyl methacrylate, 2-hydroxyethyl acrylate, hydroxypropyl acrylate and N-methylolacrylamide, with, for example, styrene, methyl methacrylate, ethyl methacrylate, n-butyl methacrylate, isobutyl methacrylate, tert-butyl methacrylate, acrylonitrile, methacrylonitrile, methyl acrylate, ethyl acrylate, n-butyl acrylate, isobutyl acrylate, tert-butyl acrylate, 2-ethylhexyl acrylate, 2-ethylhexyl methacrylate, and the like. If desired, such acrylic polyols may be those formed by copolymerizing the above-mentioned monomers additionally with amino-containing monomers, such as 2-diethylaminoethyl methacrylate and tert-butylaminoethyl methacrylate, glycidyl-containing monomers, such as glycidyl acrylate and glycidyl methacrylate, amide-containing monomers, such as acrylamide and methacrylamide, or acid-group containing monomers, such as acrylic acid, methacrylic acid, maleic anhydride, crotonic acid, fumaric acid and itaconic acid as well as furthermore fumarates, itaconates, etc.

When the acrylic polyol shows a molecular weight of not more than 1,000, the resulting coating film demonstrates lowered physical properties, for example, decreased flexibility, weathering resistance and chemical resistance, whereas the molecular weight of not less than 100,000 increases the viscosity and in some instances deteriorates the paintability. Also, the hydroxyl value of not more than 20 deteriorates the chemical resistance of the coating film, while, on the other hand, the hydroxyl value of not less than 200 sometimes deteriorates its flexibility, impact resistance and adherence.

The urethane resin compositions of this invention are two-part polyurethane resin compositions which comprise (i) the above-described polyisocyanate component consisting of the TMXDI and HDI derivatives and (ii) the above-mentioned acrylic polyol.

The formulating ratio of the above components (i) and (ii) is preferably in the NCO/OH equivalent ratio of about 0.2 to 3.0, particularly about 0.7 to 1.5.

Though the compositions of this invention, as such, can be used as a clear lacquer, adhesive, etc., they may be incorporated with coloring pigments or fillers, such dispersing agents as those based on silicone, amine, polyether, polyester, cator oil, synthetic wax and bentonite, defoaming agents, levelling agents, thixotropic agents, such stabilizers as those based on benzotriazole, hindered amine and hindered phenol, such reaction catalysts as those based on tin, lead, zinc and iron, and the like.

Application is normally carried out by the use of an air spray gun, airless spray gun, etc., and can also be conducted by means of brush, roll coater, flow coater, dipping, electrostatic coating, etc. In order to adjust the viscosity suited for these application methods, the above-described solvents and mixtures thereof are used.

The application rate is in such an amount as may provide a coating film of a thickness of about 15 to 100μ.

The urethane resin compositions of this invention thus obtained can provide coating films with excellent drying property, mechanical properties, weathering resistance and chemical resistance, and are advantageously used, for example, as a paint for automobile repairing uses.

The reference examples, examples and comparative examples are described below to illustrate this invention more specifically; the terms "part" and "%" should be understood to be on a weight basis.

REFERENCE EXAMPLE 1

Production of the isocyanate derivatives (i) Production of the TMXDI Prepolymer (a)

Charged in a reaction vessel were 976 parts of m-TMXDI, 44.7 parts of trimethylolpropane (hereinafter referred to briefly as "TMP") and 0.05 part of dibutyltin dilaurate, and a urethane production reaction was carried out at 80° to 85° C. for 4 hours, with stirring under a stream of $N_2$. The completion of the reaction was confirmed by use of the amine equivalent method, and the reaction mixture was cooled. Subsequently, the excessive m-TMXDI was removed by a wiped film distillation apparatus under the conditions of the wall surface temperature of 150° to 155° C. and the pressure of 0.1 to 0.2 mmHg. The resulting m-TMXDI-TMP prepolymer was diluted with ethyl acetate to give a prepolymer solution with a solid content of 75%, NCO equivalent of 440 and viscosity of 2,100 cps (at 25° C.).

(ii) Production of the TMXDI prepolymer (b)

Charged in a reaction vessel were 976 parts of m-TMXDI, 31.3 parts of TMP, 13.5 parts of 1,3-butylene glycol (hereinafter referred to briefly as "1,3-BG") and 0.02 part of 1,1,3,3-tetrabutyl-1,3-diacetoxydistannoxane, and a urethane production reaction was carried out at 80° to 85° C. for 4 hours with stirring under a stream of $N_2$. The completion of the reaction was confirmed by means of the amine equivalent method, and the reaction mixture was cooled. Subsequently, the excessive m-TMXDI was removed with use of an extraction column at 40° C. using n-hexane as an extraction solvent. The resulting m-TMXDI-TMP-1,3-BG prepolymer was diluted with ethyl acetate to give a prepolymer solution with a solid content of 75%, NCO equivalent of 445 and viscosity of 1,800 cps (at 25° C.).

(iii) Production of the HDI derivative (c)

Charged in a reaction vessel were 840 parts of HDI, 252 parts of trimethyl phosphate and 9 parts of distilled water, and a urea production reaction was carried out at 65° to 75° C., for 2 hours with stirring. The completion of the urea production was confirmed by the amount of $CO_2$ gas evolved, and then a biuret production reaction was conducted at a temperature raised to 110° to 125° C. for 3.5 hours. The reaction solution was cooled, and the unreacted m-TMXDI and trimethyl phosphate were removed by use of a wiped film distillation apparatus under the conditions of the wall temperature of 145° to 150° C. and pressure of 0.1 to 0.2 mmHg. The biuret derivative of HDI was diluted with ethyl acetate to a solution with an NCO equivalent of 241, viscosity of 110 cps (at 25° C.) and solid content of 75%.

REFERENCE EXAMPLE 2

(i) Production of an acrylic polyol

By following the conventional procedure, 46.8 parts of methyl methacrylate, 28.0 parts of n-butyl acrylate, 2.0 parts of acrylic acid and 23.2 parts of 2-hydroxyethyl methacrylate were copolymerized in a mixture of 50 parts of toluene and 50 parts of butyl acetate to give an acrylic polyol solution with a molecular weight of 13,000, hydroxyl value of 50, viscosity of 550 cps (at 25° C.) and solid content of 50%.

(ii) Production of a white enamel

A 1122 parts quantity of the above acrylic polyol, 513.6 parts of Taipek (titanium oxide; produced by Ishihara Sangyo Kaisha of Japan), 264.4 parts of xylene, 164.4 parts of butyl acetate and 2.0 parts of BYK-354 (BYK-Mallincrodt Co.) were subjected to blending in a Pebble mill for 25 hours to give a white enamel with a hydroxyl equivalent of 2,000.

EXAMPLE 1

A 2,000 parts quantity of the white enamel as obtained in Reference Example 2 was mixed with 246.8 parts of the m-TMXDI prepolymer (a) and 105.8 parts of the HDI derivative (c), and after the mixture was diluted with a solvent mixture of ethyl acetate/cellosolve acetate=50/50 to a spraying viscosity, it was applied to a hot rolled steel plate treated with iron phosphate to a thickness of coating film of 30 to 40μ, followed by conditioning at ambient temperature for 7 days. The resulting coating film exhibited physical properties as shown in Table 2.

The formulations as employed in this Examples are as follows:
m-TMXDI prepolymer (a)/HDI derivative (c)=70/30 (a weight ratio on a solid basis).
Number of NCO groups in the polyisocyanate mixture/number of OH groups in the acrylic polyol=1.0.

EXAMPLE 2

A paint prepared by mixing the ingredients in accordance with the following formulations in a manner similar to that of Example 1 provided the coating film with physical properties as shown in Table 2.
m-TMXDI prepolymer (a)/HDI derivative (c)=50/50 (a weight ratio on a solid basis).
Number of NCO groups in the polyisocyanate mixture/number of OH groups in the acrylic polyol=1.0.

EXAMPLE 3

A paint prepared by mixing the ingredients in accordance with the following formulations in a manner similar to that of Example 1 provided the coating film with physical properties as shown in Table 2.
m-TMXDI prepolymer (a)/HDI derivative (c)=30/70 (a weight ratio on a solid basis).
Number of NCO groups in the polyisocyanate mixture/number of OH groups in the acrylic polyol=1.0.

EXAMPLE 4

A paint prepared by mixing the ingredients in accordance with the following formulations in a manner similar to that of Example 1 provided the coating film with physical properties as shown in Table 2.
m-TMXDI prepolymer (b)/HDI derivative (c)=50/50 (a weight ratio on a solid basis).
Number of NCO groups in the polyisocyanate mixture/number of OH groups in the acrylic polyol=0.7

EXAMPLE 5

A paint prepared by mixing the ingredients in accordance with the following formulations in a manner similar to that of Example 1 provided the coating film with physical properties as shown in Table 2.
m-TMXDI prepolymer (b)/HDI derivative (c)=50/50 (a weight ratio on a solid basis).
Number of NCO groups in the polyisocyanate mixture/number of OH groups in the acrylic polyol=1.5

COMPARATIVE EXAMPLE 1

A paint prepared by mixing the ingredients in accordance with the following formulations in a manner similar to that of Example 1 provided the coating film with physical properties as shown in Table 2.
m-TMXDI prepolymer (a)/HDI derivative (c)=90/10 (a weight ratio on a solid basis).
Number of NCO groups in the polyisocyanate mixture/number of OH groups in the acrylic polyol=1.0

COMPARATIVE EXAMPLE 2

A paint prepared by mixing the ingredients in accordance with the following formulations in a manner similar to that of Example 1 provided the coating film with physical properties as shown in Table 2.
m-TMXDI prepolymer (a)/HDI derivative (c)=10/90 (a weight ratio on a solid basis).
Number of NCO groups in the polyisocyanate mixture/number of OH groups in the acrylic polyol=1.0

COMPARATIVE EXAMPLE 3

A paint, which was prepared by mixing the ingredients in accordance with the formulation comprising 2,000 parts of the white enamel as obtained in Reference Example 2, 150 parts of a prepolymer (with an NCO equivalent of 400 and solid content of 75%: Takenate ® D-140N, produced by Takeda Chemical Industries, Ltd. of Japan) from IPDI and TMP and 150 parts of the HDI derivative as obtained in Reference Example 1, provided the coating film with physical properties as shown in Table 2.

The formulations as employed in the Comparative Example are as follows:

IPDI prepolymer/HDI derivative (c)=50/50 (a weight ratio on a solid basis).
Number of NCO groups in the polyisocyanate mixture/number of OH groups in the acrylic polyol=1.0.

TABLE 2

|  | Example 1 | Example 2 | Example 3 | Example 4 | Example 5 | Comparative Example 1 | Comparative Example 2 | Comparative Example 3 |
|---|---|---|---|---|---|---|---|---|
| Formulations |  |  |  |  |  |  |  |  |
| Ratio of TMXDI prepolymer (a)/ HDI derivative (c) | 70/30 | 50/50 | 30/70 |  |  | 90/10 | 10/90 |  |
| Ratio of TMXDI prepolymer (b)/ HDI derivative (c) |  |  |  | 50/50 | 50/50 |  |  |  |
| Ratio of IPDI prepolymer/HDI derivative (c) |  |  |  |  |  |  |  | 50/50 |
| Number of NCO groups of polyisocyanate/ Number of OH groups of acrylic polyol | 1.0 | 1.0 | 1.0 | 0.7 | 1.5 | 1.0 | 1.0 | 1.0 |
| Physical properties of the coating film |  |  |  |  |  |  |  |  |
| Curing time (JISK 5400 hr.:min.) | 0:55 | 1:10 | 1:25 | 1:45 | 0:45 | 0:40 | 4:10 | 1:20 |
| Erichsen cupping test (mm) | 6.5 | 7.0 | 8.8 | 9.0 | 6.0 | 2.5 | 9.0 | 3.0 |
| Bending test (Bending tester mmφ) | 4 | 3 | 2 | 2 | 3 | 10 | 2 | 8 |
| Impact test (Dupont, g × cm) | 500 × 30 | 500 × 50 | 1000 × 40 | 1000 × 30 | 500 × 30 | 300 × 20 | 1000 × 40 | 300 × 40 |
| Alkali resistance (5% NaOH, 30 days) | NC | NC | NC | NC | NC | NC | Deteriorated gloss | NC |
| Acid resistance (5% H2SO4, 30 days) | NC | NC | NC | NC | NC | Blister | Deteriorated gloss | Blister |
| Weathering test (QUV method, 2000 hr.) |  |  |  |  |  |  |  |  |
| Degree of discoloration ΔE | 1.2 | 1.0 | 0.9 | 0.8 | 1.4 | 1.5 | 1.3 | 1.2 |
| Gloss retention % | 84 | 85 | 80 | 72 | 83 | 82 | 85 | 83 |

(Note) NC; No changes

What is claimed is:

1. A urethane resin composition which comprises (i) a polyisocyanate component having 20/80 to 80/20 of a weight ratio on a solid basis of an α,α,α',α'-tetramethyl-xylylene diisocyanate derivative to a hexamethylene diisocyanate derivative and (ii) an acrylic polyol.

2. A urethane resin composition as claimed in claim 1, wherein the α,α,α',α'-tetramethyl-xylylene diisocyanate derivative is a prepolymer obtained by the reaction of α,α,α',α'-tetramethyl-xylylene diisocyanate with a low-molecular-weight polyol at an excessive isocyanate/hydroxyl ratio.

3. A urethane resin composition as claimed in claim 1, wherein the hexamethylene diisocyanate derivative is a prepolymer obtained by the reaction of hexamethylene diisocyanate with a low-molecular weight polyol, a biuret derivative obtained by the reaction of hexamethylene diisocyanate with water or an amine or a dimerized or trimerized product of hexamethylene diisocyanate.

4. A urethane resin composition as claimed in claim 1, wherein the mixing ratio of the α,α,α',α'-tetramethyl-xylylene diisocyanate derivative to the hexamethylene diisocyanate derivative is in such an amount as corresponds to a weight ratio as converted on a solid basis in the range of 30/70 to 70/30.

5. A urethane resin composition as claimed in claim 1, wherein the acrylic polyol is one having a molecular weight of 1,000 to 100,000 and a hydroxyl value of 20 to 200.

6. A urethane resin composition as claimed in claim 1, wherein the formulating ratio of the components (i) and (ii) is in the NCO/OH equivalent ratio of about 0.2 to 3.0.

7. A urethane resin composition as claimed in claim 1, wherein the formulating ratio of the components (i) and (ii) is in the NCO/OH equivalent ratio of about 0.7 to 1.5.

* * * * *